Dec. 19, 1944.  H. D. GEYER ET AL  2,365,544
POWER TRANSMISSION DEVICE
Filed Jan. 27, 1942  2 Sheets-Sheet 1

INVENTORS
Harvey D. Geyer
Rex E. Moule
By Spencer Hardman & Fehr
their ATTORNEYS Dec. 19, 1944. H. D. GEYER ET AL 2,365,544
POWER TRANSMISSION DEVICE
Filed Jan. 27, 1942 2 Sheets-Sheet 2
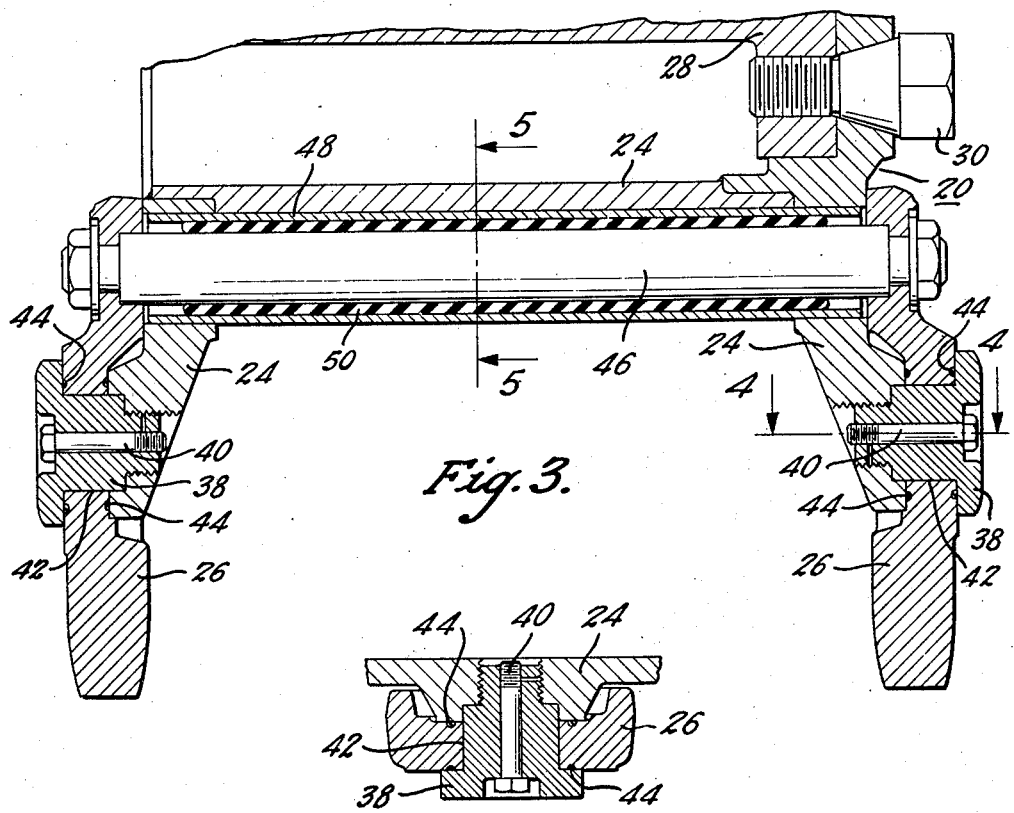
Fig. 3.
Fig. 4.
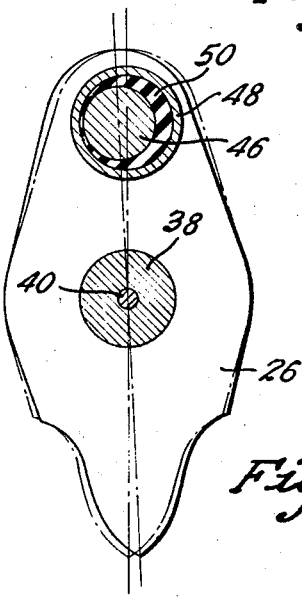
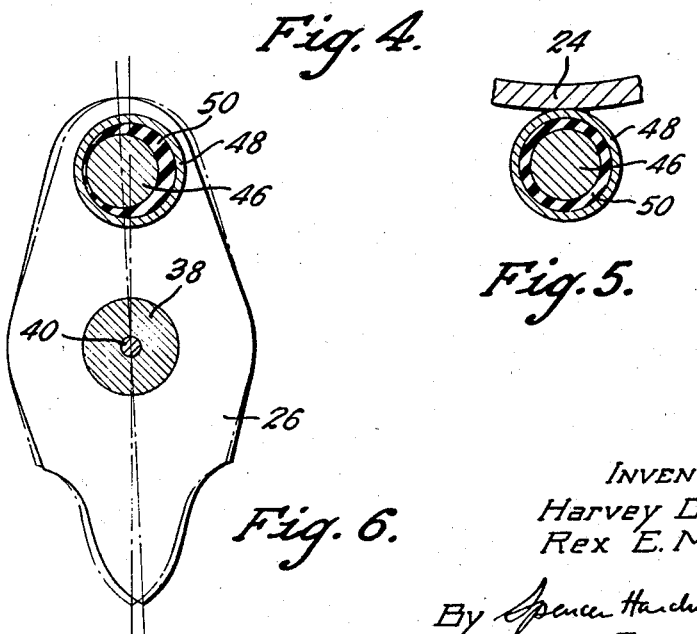
Fig. 5.
Fig. 6.
INVENTORS
Harvey D. Geyer
Rex E. Moule
By Spencer Hardman & Fehr
their ATTORNEYS Patented Dec. 19, 1944

2,365,544

UNITED STATES PATENT OFFICE 2,365,544

POWER TRANSMISSION DEVICE

Harvey D. Geyer and Rex E. Moule, Dayton, Ohio, assignors to General Motors Corporation, Detroit, Mich., a corporation of Delaware Application January 27, 1942, Serial No. 428,402

12 Claims. (Cl. 74—243)

This invention relates to power transmission devices and is particularly concerned with sprockets, racks, gears and the like.

An object of the invention is to provide a power transmission device which includes a plurality of teeth thereon, which teeth are resiliently mounted on a supporting member, for example, a sprocket wherein the teeth are resiliently mounted on the hub portion whereby the teeth may shift circumferentially for adjusting the distance therebetween for reducing shock caused by sudden changes of speed of the part driven or to be driven, and for reducing wear and noise.

A further object of the invention is to provide a sprocket or the like wherein the teeth are fulcrumed upon the hub portion and are resiliently positioned at the supported end thereof so that the outer portion of the teeth may be resiliently shifted against the yieldable resilient means and wherein the teeth are returned to their original positions after the cause of shifting is removed.

A still further object of the invention is to provide a driving means for use in track laying vehicles, such as tanks and tractors wherein sprockets are provided for the endless tracks and wherein the spacing of the teeth engaging portions of said tracks varies so as to cause uneven wear on the teeth. By utilizing the invention herein described the teeth being self adjusting are capable of changing pitch sufficiently to accommodate variations in the track and thereby reduce the wear, noise and provide a more efficient and economical driving mechanism.

Further objects and advantages of the present invention will be apparent from the following description, reference being had to the accompanying drawings wherein preferred embodiments of the present invention are clearly shown.

In the drawings:

Fig. 3 is a fragmentary sectional view taken on line 3—3 of Fig. 2.

Fig. 4 is a sectional view on the line 4—4 of Fig. 3.

Fig. 5 is a sectional view taken on the line 5—5 of Fig. 3.

Fig. 6 is a view of one tooth of the sprocket in a shifted position.

Torque transmission devices and the like, such as sprockets and gears, under certain conditions wear unevenly at the tooth portions thereof. This uneven wear is usually attributable to the complementary portion being driven by the device. This same difficulty is often encountered in racks and other power transmission devices. One of the most critical of applications of a device of this character is in tanks and tractors where an endless track is supported on and driven by two sprockets which track has spaces between segments thereof which interfit with the teeth of the sprockets. It has been found, particularly in heavy duty work, that there is great difficulty in keeping these spaces accurately dimensioned and therefore certain of the teeth on the sprockets are worn more rapidly than others due to the uneven spacing of the track which is driven thereby. This difficulty is of great importance since it reduces the strength of certain of the teeth and causes replacement or repairing of the sprocket periodically with regards to one or two teeth thereof. In order to eliminate this difficulty and simultaneously provide a better sprocket which is shock absorbing in nature and likewise is self adjusting with regard to the pitch of the teeth we have provided for resiliently mounted teeth that are carried by the sprocket hub and which are self adjusting a limited distance circumferentially with respect to the hub. In this manner uneven spacing on the track or other complementary driving or driven portions is compensated for without excessive wear on any one part of the sprocket. Likewise resiliently mounted teeth take up shock loads, which condition is often critical on conventional sprockets, gears and racks, for if the load is applied with a shock and the teeth are worn or brittle there is a possibility that one or more teeth will be cracked off. In the present device, however, due to the resilient mounting of the teeth, the shock load is taken up and saves fractures of the teeth.

Similar structures may be used in gears for idlers and the like wherein a self adjusting tooth structure is particularly desirable.

Figure 1:
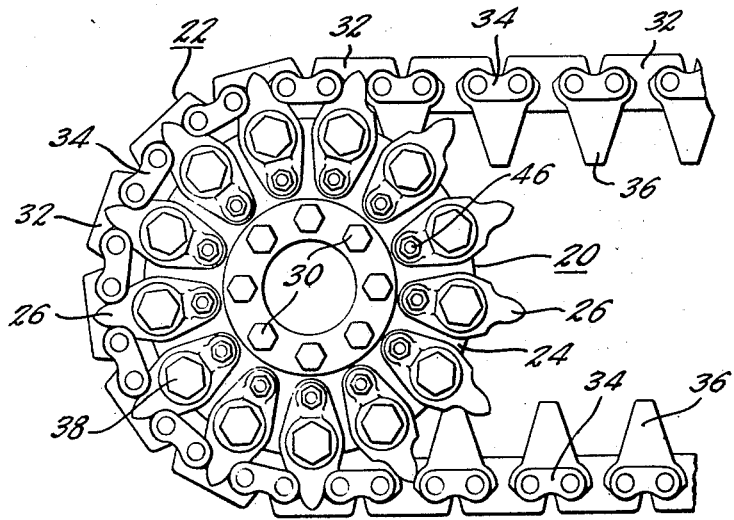
Fig. 1 is a fragmentary view of one embodiment of the invention as used in a tank or tractor showing one sprocket and a portion of the track.

Referring to the drawings, one embodiment of the invention is shown as applied to a tank. This embodiment is illustrated in part in Fig. 1 wherein 20 represents a sprocket and 22 a tank track. The sprocket 20 consists of a hub portion 24 having a plurality of resiliently and pivotally mounted teeth 26 mounted thereon. The sprocket 20 is bolted to a driving drum 28 as shown in Fig. 3 by means of a plurality of bolts 30. The track 22 consists of a plurality of rubber tread portions 32 hingedly attached together by means of links 34 which carry teeth 36 thereon. The teeth 36 are used as lateral spacing and aligning means.

Figure 2:
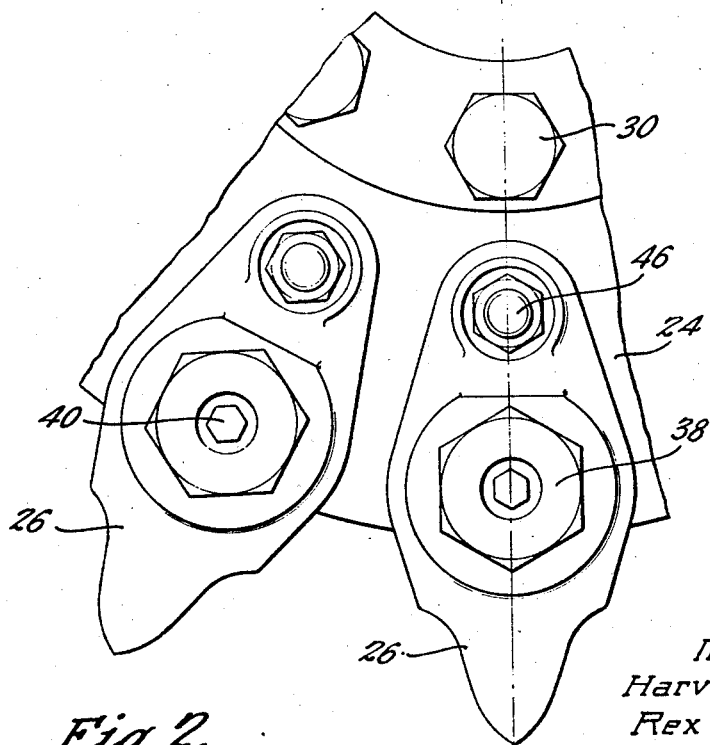
Fig. 2 is an enlarged fragmentary view of two teeth and a portion of the hub mounting of the sprocket.

Reference to Fig. 2 shows the tooth construction in enlarged form wherein each tooth 26 is pivotally mounted on the hub portion 24 through a pivot pin or bolt 38. The bolt 38 screws into the hub portion through an aperture in the tooth and the tooth is rotatable thereon. In order to insure that the bolt 38 will remain in place a small screw 40 is screwed through the center thereof to expand the thread portion as shown in Fig. 3 and thereby lock the pivot bolt in place. Since the tooth 26 has a bearing on the bolt 38 as at 42 in Fig. 3, it is desirable to keep dirt, etc., from entering this journal. This is accomplished by the use of a pair of DuPrene, Neoprene or similar material rings 44 which are disposed on either side of the tooth 26, and seal the journal of the tooth from the possibility of accumulating dirt.

The inner portion of tooth 26 has a second aperture therein through which is fitted an elongated bolt or bar 46. The bar 46 in the embodiment illustrated extends entirely through the hub and engages a similar portion on the tooth at the other side of the hub since in most cases it is desirable to have a sprocket on either side of the hub. Obviously, if only one sprocket is provided the bolt merely screws into the hub. This bolt or bar 46 passes through a tube 48 as shown in Fig. 3 and has appreciable clearance therebetween. In this clearance portion is disposed a rubber tube or a plurality of rubber bushings 50 which are highly compressed between the tube and the bar thereby providing a resilient or yieldable connection therebetween. Thus, in the tooth structure, as noted in Figs. 2 and 3, if the outer end of the tooth 26 has a force applied thereto it tends to pivot about the bolt 38 and against the yieldable rubber bushings 50. In this manner the tooth 26 is shiftable a limited amount as determined by the rubber 50 as shown in Fig. 6.

It is apparent that instead of the rubber passing through the tube that it could be in the form of blocks pressed between the teeth and in this manner similar results would be accomplished although the particular structure shown is preferred. Likewise it is possible that pivot bolt 38 could be placed at the rear of the tooth and with resilient portion toward the front of the tooth whereby somewhat similar results will be obtained, all of such variations coming in the scope of our invention. Likewise in structures where small loads are carried it would be possible to form the entire hub portion of the resilient material and insert the teeth therein, although it is apparent that this type of structure could not carry loads of any magnitude.

The shiftable character of the teeth permits wide variations in the link spacings on the belt track or chain as the case may be, reduces the wear on the teeth and on the chain belt or track, takes up shock and reduces noise, all of which is very desirable for driving mechanisms of this type. It is to be understood that in the claims appended hereto that the term sprocket is used in a generic sense and may include gears, sprockets, etc., or in fact any device which may be used to drive a chain, gear or rack, etc. Likewise racks are to be included in the generic term "sprocket."

In the preferred embodiment of the invention as shown in the drawings a salient feature resides in the fact that the pitch diameter of the sprocket is substantially constant since each tooth is pivoted on an immovable pivot and while the pitch of the teeth, or the effective circumferential displacement of the teeth may be varied, the pitch diameter thereof does not vary substantially.

While the embodiments of the present invention as herein disclosed, constitute preferred forms, it is to be understood that other forms might be adopted, all coming within the scope of the claims which follow.

What is claimed is as follows:

1. A shiftable tooth structure for use in connection with sprockets, racks and the like, comprising in combination; a supporting member, a tooth associated with said member and rotatable with respect thereto, yieldable means associated with the tooth and with the member for holding the tooth in a central position whereby the tooth may be rotated in either direction against the action of said yieldable means and with respect to said member when force is applied thereto, said yieldable means returning the tooth to the original position thereof when said force is relieved and limiting means associated with the said yieldable means for limiting the rotational movement of said tooth in either direction.

2. A sprocket structure including self-adjusting teeth thereon, comprising in combination; a hub portion, a plurality of independently shiftable teeth associated with said portion and around the periphery thereof, each of said teeth being rotatable with respect to said hub portion, separate means for opposing movement of each of said teeth with respect to said hub, said means being yieldable whereby when force is applied to the teeth, that the teeth can be rotated a limited distance against said means in either direction and when the force is removed therefrom that the teeth will assume their normal position with respect to the hub whereby adjustments and distance between the teeth are automatically accomplished without excessive wear of the teeth.

3. A sprocket structure comprising in combination; a hub portion, a plurality of elongated tooth members associated therewith and independently mounted radially around the circumference thereof, each of said members having a tooth portion at the outer end thereof, separate yieldable means associated with each of said members and said hub for opposing movement of the members on their independent mountings, said members being displaceable in either direction a limited amount circumferentially against said yieldable means when sufficient force is applied to the tooth portions thereof, said yieldable means returning the members to their original position upon removal of the force whereby the tooth members are self adjusting with respect to one another for reducing wear and strain thereon.

4. A sprocket structure comprising in combination; a hub portion, a plurality of pivot pins radially disposed around the periphery thereof, a plurality of elongated members each mounted upon one of said pivot pins and rotatable with respect thereto, said members having sprocket tooth portions associated with the outer ends thereof, a plurality of anchor pins associated with the hub and fitting loosely in the apertures in said members at a distance spaced from said pivot pins, and resilient means surrounding said anchor pins and compressed within the apertures of said members said members being rotatable a limited distance only as determined by the yieldable nature of the resilient means whereby the teeth portions thereof are radially displaceable for permitting self adjustment of the distance between the teeth and thereby improving the action and wearing properties of the teeth.

5. A tooth structure for use in sprockets and the like comprising in combination, a supporting hub member, a plurality of circumferentially spaced pins set in said hub member and spaced from the center thereof, a plurality of independent teeth pivoted on said pins, each of said teeth being shiftable in either direction of rotation around said pins and separate resilient means associated with each of said teeth for holding the teeth in a central location on radians of said hub whereby the teeth can be shifted in either direction around the pivot pins against the action of said resilient means.

6. A sprocket structure comprising in combination, a hub portion, a plurality of pivot pins radially disposed around the periphery thereof and at right angles with the plane of said hub, a plurality of elongated tooth members one of each being mounted on each of said pivot pins and rotatable with respect thereto, a plurality of anchor pins radially displaced around said hub on a circle having a diameter less than the diameter of the circle locating said pivot pins, said anchor pins fitting loosely in apertures in the tooth members and highly compressed rubberlike material filling the space between the apertures and the anchor pins for centrally locating the tooth members on a line through said pivot pins, said anchor pin and the center of said hub, said tooth members being movable in either direction of rotation around said pivot pins upon force applied at the outer tooth portions thereof against the resiliency of said rubberlike material whereby the tooth members are self adjusting for providing effective circumferential displacement thereof and thereby improving the action and wearing properties of the tooth members.

7. A sprocket structure comprising in combination, a hub, a plurality of spaced, independently pivoted tooth members equally spaced around the periphery thereof, said tooth members being shiftable for varying the circumferential spacing thereof, each of said tooth members having an anchor pin associated therewith at a point remote from said pivoted portion, said anchor pin including a resilient connection between the hub and the tooth member, whereby the tooth member may be pivoted about its pivot point against the action of said resilient means in either direction of rotation and returned to its original position by said resilient means when the force applied to cause such rotation has been removed.

8. A sprocket structure comprising in combination; a hub, a plurality of circumferentially spaced teeth pivotally mounted thereon at a point remote from the center thereof, a plurality of limiting means circumferentially spaced and associated with said hub for limiting the pivotal movement of said teeth in either direction and yieldable means associated with the hub for maintaining the teeth in a central position relative to the limiting means and for yieldably opposing pivotal movement of said teeth in either direction.

9. A sprocket structure comprising in combination; a hub, a plurality of circumferentially spaced teeth pivotally mounted thereon at a point remote from the center thereof, a plurality of limiting means circumferentially spaced on said hub and between said pivotal mountings and the center of said hub for limiting the pivotal movement of said teeth in either direction, and yieldable means associated with the hub for maintaining the teeth in a central position relative to the limiting means and for yieldably opposing pivotal movement of said teeth in either direction.

10. A sprocket structure comprising in combination; a hub, a plurality of circumferentially spaced teeth pivotally mounted thereon at a point remote from the center thereof, a plurality of limiting means circumferentially spaced on and associated with said hub for limiting the pivotal movement of said teeth in either direction, and a separate resilient means associated with each of said teeth and with the hub for maintaining the teeth in a central position relative to the limiting means and for resiliently opposing pivotal movement of said teeth in either direction.

11. A sprocket structure comprising in combination a central hub member two rows of an equal number of circumferentially spaced pins associated with said hub member, one of said rows being of less diameter than the other, a plurality of teeth, one of which is pivotally mounted on each of the greater diameter row of pins, each of said teeth having a portion thereof loosely engaging one of the other rows of pins so that each tooth may pivot a limited distance on either side of a central position and yieldable means associated with said teeth for holding the teeth in a central position with respect to the limiting means and for yieldably opposing said limited pivotal movement of said teeth.

12. A tooth structure comprising in combination a supporting member, a pin on said supporting member adapted to act as a pivot, a second pin spaced from said first pin and in direct alignment therewith adapted to act as a limiting means, a tooth pivotally mounted on the first pin and having a portion thereof which engages the second pin for limiting the pivotal movement of the tooth, and yieldable means for holding said tooth in a central position with respect to said limiting means and for yieldably opposing pivotal movement of said tooth in either direction.

HARVEY D. GEYER.
REX E. MOULE.